(12) United States Patent
Maeda

(10) Patent No.: US 7,312,988 B2
(45) Date of Patent: Dec. 25, 2007

(54) ELECTRONIC DEVICE

(75) Inventor: Hitohiro Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/374,136

(22) Filed: Mar. 14, 2006

(65) Prior Publication Data

US 2006/0158073 A1    Jul. 20, 2006

Related U.S. Application Data

(63) Continuation of application No. PCT/JP03/012017, filed on Sep. 19, 2003.

(51) Int. Cl.
*G06F 1/20* (2006.01)
(52) U.S. Cl. .................... 361/687; 361/709; 361/681
(58) Field of Classification Search ........... 361/687, 361/681, 709
See application file for complete search history.

(56) References Cited

U.S. PATENT DOCUMENTS

| | | | |
|---|---|---|---|
| 5,283,674 A | | 2/1994 | Hanaoka et al. |
| 5,313,362 A | * | 5/1994 | Hatada et al. ............... 361/687 |
| 6,816,371 B2 | * | 11/2004 | Agata et al. ................. 361/687 |
| 7,070,291 B2 | * | 7/2006 | Sotokawa et al. .......... 362/632 |
| 2002/0113534 A1 | * | 8/2002 | Hayashi et al. .............. 313/113 |
| 2004/0223299 A1 | * | 11/2004 | Ghosh ......................... 361/687 |
| 2006/0133032 A1 | * | 6/2006 | Uchida et al. ............... 361/687 |

FOREIGN PATENT DOCUMENTS

| | | | |
|---|---|---|---|
| JP | 04048693 A | * | 2/1992 |
| JP | 4-354010 | | 12/1992 |
| JP | 5-93908 | | 4/1993 |
| JP | 10-54985 | | 2/1998 |
| JP | 11-84381 | | 3/1999 |
| JP | 2001-282396 | | 10/2001 |
| JP | 2002-189207 | | 7/2002 |
| JP | 2003-100130 | | 4/2003 |

* cited by examiner

*Primary Examiner*—Lisa Lea-Edmonds
(74) *Attorney, Agent, or Firm*—Westerman, Hattori, Daniels & Adrian, LLP.

(57) ABSTRACT

An electronic device includes: a body 12 having an electronic component 20, and a cover 14 pivotally attached to the body and having a liquid crystal panel 36. The electronic component of the body is cooled by a fan 22. The liquid crystal panel of the cover is illuminated by a discharge tube 38 and a reflector 40. An air inlet 44 of the cover is arranged being opposed to an air outlet 30 of the body. The discharge tube is cooled by a flow of air produced by the fan for cooling the electronic component of the body. By cooling the discharge tube, the life of the discharge tube is maintained long.

8 Claims, 8 Drawing Sheets

ELECTRONIC DEVICE

CROSS-REFERENCE TO RELATED APPLICATION

This application is a continuation application and is based upon PCT/JP03/12017, filed on Sep. 19, 2003.

BACKGROUND OF THE INVENTION

1. Field of the Invention

The present invention relates to an electronic device such as a note-book type personal computer and others.

2. Description of the Related Art

The note-book type personal computer includes: a body having electronic components such as CPU and others and also having a keyboard; and a cover pivotally connected to the body. The cover includes: a display element such as a liquid crystal display element; and a lighting device for lighting the display element. The lighting device includes: a light guide plate; a discharge tube (cold cathode ray tube) arranged on a side of the light guide plate; and a reflector.

A problem is caused in which a luminous intensity of the discharge tube is lowered even when the liquid crystal element has not come to the life. The reason is described as follows. Liquid mercury charged in the discharge tube is collected at positions close to the electrodes arranged at both end portions of the discharge tube. Metal of the electrodes of the discharge tube is spattered by electrons generated in accordance with discharging, and particles of metal, which have been spattered in this discharging process, attach to a tube wall of the discharge tube as if the particles of metal covered the liquid mercury. Therefore, although a sufficiently large quantity of mercury has been charged into the discharge tube, a quantity of mercury contributing to the emission of light is reduced. Therefore, the luminous intensity of the discharge tube is lowered and the life of the discharge tube is shortened.

Originally, portions close to the electrodes at both end portions of the discharge tube are portions where a large quantity of heat is generated and the temperature is high. However, in the structure in which the discharge tube is supported by a reflector through a support member, heat generated by the discharge tube is thermally conducted to the reflector through the support member. Therefore, temperatures of portions close to the electrodes of the discharge tube are lowered. Since liquid mercury is collected to positions in the discharge tube where the temperatures are low, that is, since liquid mercury is collected to positions close to the electrodes at both end portions of the discharge tube, the above problems are caused. Therefore, when a portion except for both end portions of the discharge tube is cooled, for example, a central portion of the discharge tube is cooled, liquid mercury is collected in the central portion of the discharge tube, the temperature of which is low. Therefore, a quantity of mercury contributing to the emission of light is not reduced. Accordingly, luminance of the discharge tube is not reduced and it becomes possible to prevent the life of the discharge tube from being shortened.

For example, there is a proposal in which an air flow is generated in a cover by a natural convection, and a discharge tube is cooled by this air flow. (Concerning this technique, refer to Japanese Unexamined Patent Publication (Kokai) Nos. 61-294528, 4-290107, 5-93908 and 2002-189207.) However, according to this method, a quantity of air in the flow is so small that cooling can not be sufficiently executed. There is another proposal in which a fan is provided in a cover so as to cool a discharge tube. (Concerning this method, refer to Japanese Unexamined Patent Publication (Kokai) No. 10-54985). However, when the fan is arranged in the cover, the cover size is increased. Therefore, it becomes necessary that the entire cover is redesigned.

SUMMARY OF THE INVENTION

An object of the present invention is to provide an electronic device in which the life of a discharge tube for lighting a display element can be prolonged.

An electronic device of the present invention comprises: a first housing having a cooling fan; and a second housing pivotally connected to the first housing, having a display element, a discharge tube for lighting the display element and a reflector, wherein the discharge tube is cooled by a flow of air generated by the cooling fan provided in the first housing.

In this electronic device, the discharge tube is cooled by a flow of air generated by the fan for cooling the electronic component arranged in the first housing. Accordingly, a sufficiently large quantity of cooling air blows to the discharge tube. Therefore, the discharge tube can be sufficiently cooled and its performance can be maintained. Since the fan is provided in the first housing, it is unnecessary to greatly changed the design of the cover. In this case, it is unnecessary that the outlet of the cooling air passage including the fan of the first housing is positively connected to the inlet of the cooling air passage of the cover but the outlet of the cooling air passage of the first housing may be opposed to the inlet of the cooling air passage of the cover through a small gap. Due to this structure, a flow of air generated by the fan of the first housing flows into the inlet of the cooling air passage of the second housing.

DESCRIPTION OF THE PREFERRED EMBODIMENTS

Figure 1:
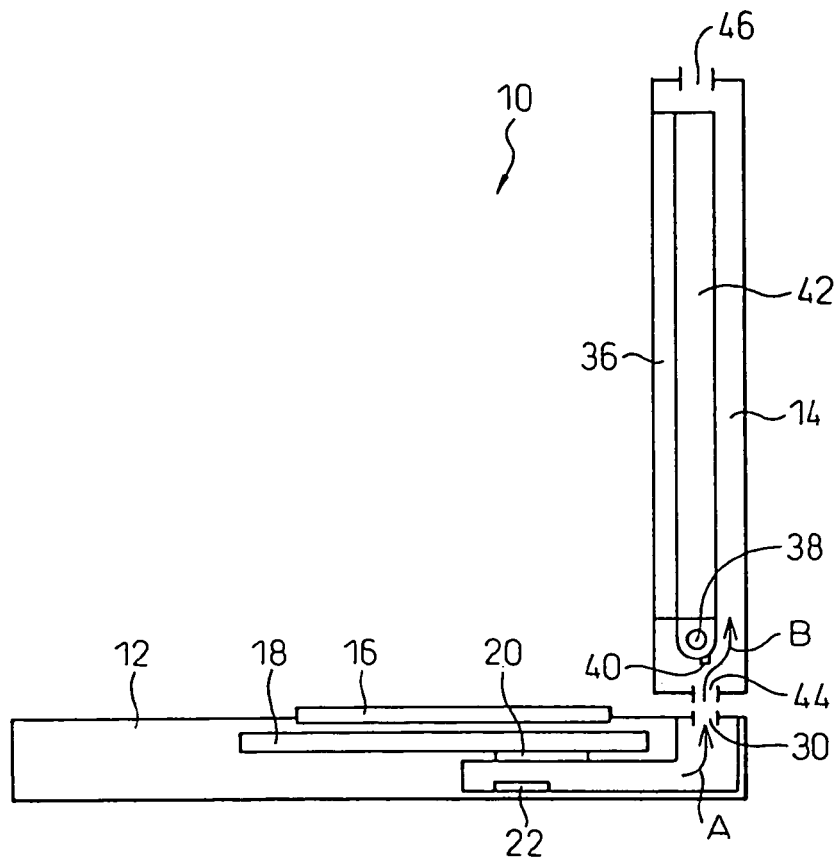
FIG. 1 is a side view showing a liquid crystal display device of an embodiment of the present invention.
Figure 2:
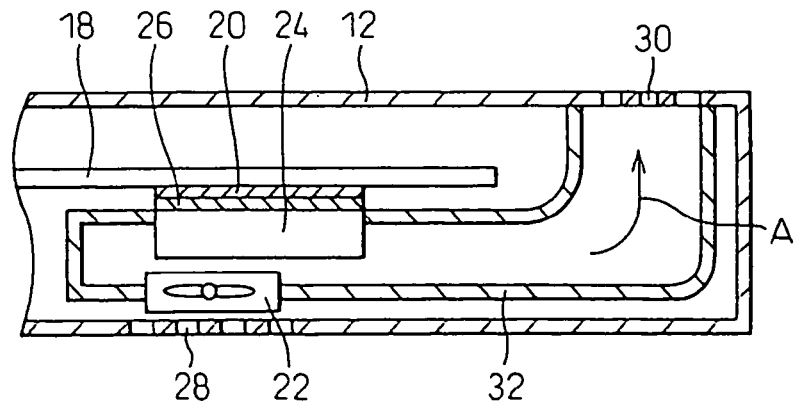
FIG. 2 is a partially enlarged sectional view showing a portion of the liquid crystal display device shown in FIG. 1.

FIG. 1 is a side view showing a liquid crystal display device of an embodiment of the present invention. FIG. 2 is a partially enlarged sectional view showing a portion of the liquid crystal display device shown in FIG. 1. In FIGS. 1 and 2, the liquid crystal display device 10 is a note-book type personal computer composed of a body (a first housing) 12 and a cover (a second housing) 14 pivotally connected to the body 12. In this embodiment, the cover 14 is pivotally attached to the body 12 by a hinge. The body 12 includes: a keyboard portion 16 having a large number of keys; a mother board 18; and CPU 20 mounted on the mother board 18. CPU 20 is an example of the electronic components. Other electronic components and electrical parts are mounted on the mother board 18.

The body 12 is provided with a fan 22 for cooling CPU 20. The heat sink 26 having the fin 24 is attached to CPU 20. The body 12 is provided with an air inlet 28 and an air outlet 30, and the fan 22 is arranged between the air inlet 28 and the air outlet 30. It is preferable that the air passage formed between the fan 22 and the air outlet 30 is composed of a duct 32. Although the air inlet 28 is provided in the bottom portion of the body 12, it may be arranged in the side portion of the body 12. In this embodiment, the fin 24 is located inside the duct 32. As shown by the arrow A, after the cooling air has cooled CPU 20 through the fin 24 and the heat sink 26, it flows toward the air outlet 30.

Figure 3:
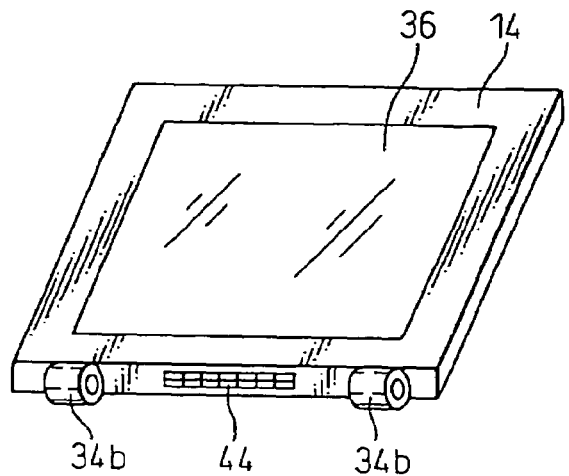
FIG. 3 is a perspective view of a cover, wherein the view is taken from a bottom portion.
Figure 4:
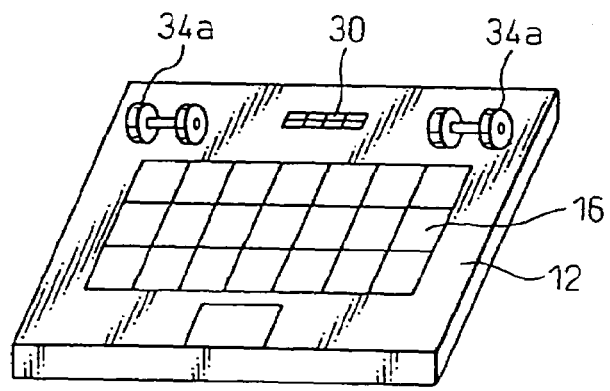
FIG. 4 is a perspective view of a body.

FIG. 3 is a perspective view of a cover 14, wherein the view is taken from a bottom portion. FIG. 4 is a perspective view of the body. The cover 14 is pivotally connected to the body 12 by a hinge. This hinge is composed of a hinge member 34a, which is arranged in the body 12, and a hinge member 34b which is arranged in the cover. The hinge member 34a includes a shaft inserted into a hole formed in the hinge member 34b.

The cover 14 includes: a liquid crystal panel 36 which is a display element; a discharge tube 38 for lighting the liquid crystal panel 36; and a reflector 40. Further, the light guide plate 42 is provided on the cover 14. The light guide plate 42 is arranged being overlapped on the liquid crystal panel 36, and the discharge tube 38 is arranged on the side of the light guide plate 42. Light emergent from the discharge tube 38 is directly sent to the light guide plate 42. Alternatively, light emergent from the discharge tube 38 is sent to the light guide plate 42 after it has been reflected on the reflector 40. After light has been sent to the light guide plate 42, while the light is being reflected on the surface and the bottom face of the light guide plate 42, it spreads in the light guide plate 42 and is emergent from the surface of the light guide plate 42 and incident upon the liquid crystal panel 36.

The cover 14 is provided with an air inlet 44 and an air outlet 46. Air which has been blown out from the air outlet 30 of the body 12 enters the air inlet 44 of the cover 14. In the cover 14, air flows along the reflector 40 as shown by the arrow B in FIG. 1 and cools the discharge tube 38 through the reflector 40.

When the cover 14 is located at a position open to the body 12 as shown in FIG. 1, the air inlet 44 of the cover 14 is arranged being opposed to the air outlet 30 of the body 12. Accordingly, even when the air inlet 44 of the cover 14 is not directly connected to the air outlet 30 of the body 12, air, which has been blown out from the fan 22 and flowed in the duct 32 and discharged from the air outlet 30, is pushed into the air inlet 44 of the cover 14. It is preferable that the air inlet 44 of the cover 14 is larger than the air outlet 30 of the body 12. Due to the above structure, a larger quantity of air can be pushed into the air inlet 44 of the cover 14 from the air outlet 30 of the body 12.

It is preferable that the air inlet 44 of the cover 14 is arranged at a position so that a central portion of the discharge tube 38 can be cooled. Due to the foregoing, mercury charged into the discharge tube 38 is collected at the central portion of the discharge tube 38. Therefore, even when metal of the electrode of the discharge tube 38 is spattered by electrons generated in the process of electrical discharge, particles of metal, which have been spattered, do not cover mercury. Accordingly, a sufficiently large quantity of mercury can be maintained, and there is no possibility that a luminous intensity of the discharge tube 38 is lowered. Further, there is no possibility that the life of the discharge tube 38 is shortened. In this connection, the central portion of the discharge tube 38 in not necessarily cooled but a portion separate from the electrode, which is located at the end portion of the discharge tube 38, may be cooled. In this case, it is composed in such a manner that the air flowing from the air inlet 44 into the air outlet 46 does not substantially cool the end portion of the discharge tube 38.

For example, when CPU 20 is fully operated, the temperature of air flowing out from the air outlet 30 of the body 12 is approximately 42° C., and the surface temperature of the reflector 40 is approximately 52° C. Therefore, even when CPU 20 is fully operated, the temperature of the discharge tube 38 can be locally lowered through the reflector 40.

As described above, according to the present invention, by utilizing the air blown out from the fan 22 for cooling CPU 20, the temperature of the discharge tube 38 is locally lowered. Therefore, the cover 14, on which the liquid crystal panel 36 is mounted, may be only provided with the air inlet 44 and the air outlet 46. Accordingly, it is unnecessary to greatly change the design of the cover 14.

Figure 5:
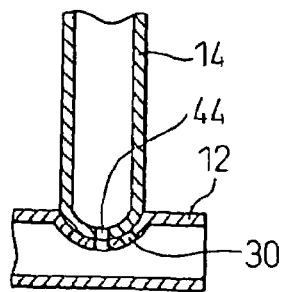
FIG. 5 is a sectional view showing an example of a connecting portion in which the body and the cover are connected to each other.

FIG. 5 is a sectional view showing an example of the connecting portion in which the body and the cover are connected with each other. In this example, a portion including the air outlet 30 of the body 12 and a portion including the air inlet 44 of the cover 14 are directly contacted with each other. Due to the above structure, most of air, which has been discharged from the fan 22 and passed through the duct 32 and blown out from the air outlet 30, can be pushed into the air inlet 44 of the cover 14.

Figure 6:
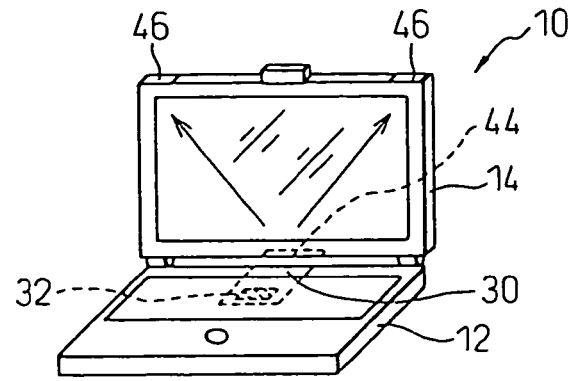
FIG. 6 is a perspective view showing an example of the liquid crystal display device.
Figure 7:
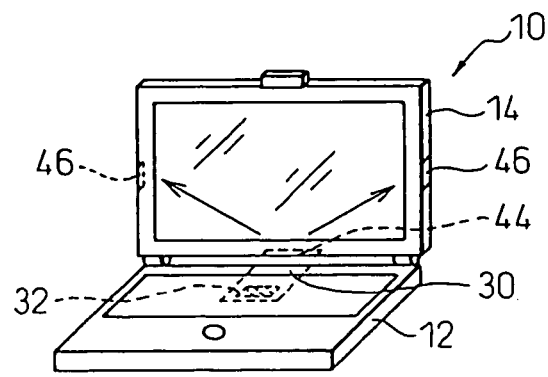
FIG. 7 is a perspective view showing an example of the liquid crystal display device.
Figure 8:
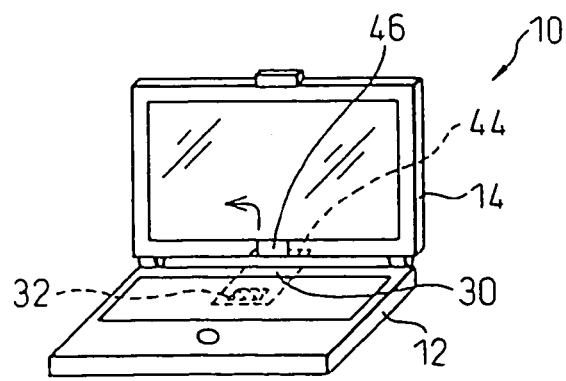
FIG. 8 is a perspective view showing an example of the liquid crystal display device.

FIGS. 6 to 8 are perspective views respectively showing an example of the liquid crystal display device. The air outlet 46 of the cover 14 is not necessarily arranged at an upper position of the air inlet 44 of the cover 14. It is possible that the air outlet 46 of the cover 14 is arranged in the side portion or in the front portion.

In FIG. 6, the air outlets 46 of the cover 14 are arranged at both upper end portions of the cover 14 which is opened, and air flows as shown by the arrow.

In FIG. 7, the air outlets 46 of the cover 14 are arranged at the central portions of the side portions of the cover 14, and air flows as shown by the arrows.

In FIG. 8, the air outlet 46 of the cover 14 is arranged on the front face side of the lower portion of the cover 14, and air flows as shown by the arrow.

Figure 9:
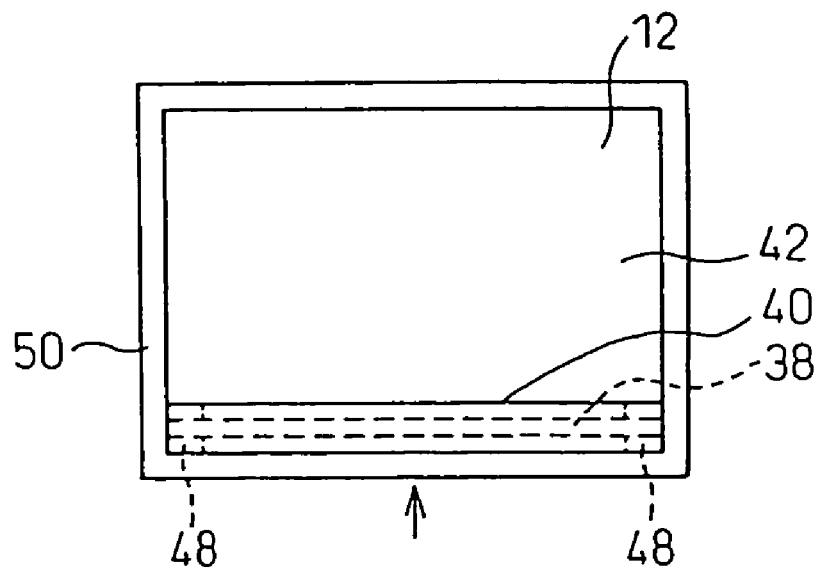
FIG. 9 is a rear view showing a liquid crystal panel assembling body.
Figure 10:
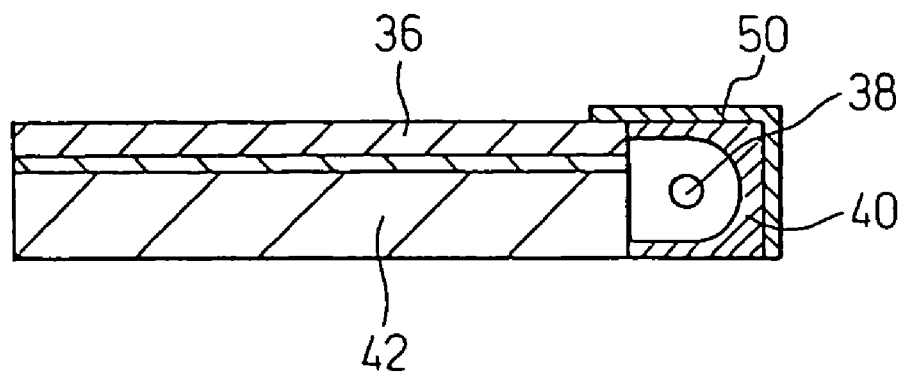
FIG. 10 is a sectional view showing a liquid crystal panel assembling body.

FIG. 9 is a rear view showing a liquid crystal panel assembling body. FIG. 10 is a sectional view showing a liquid crystal panel assembling body. The liquid crystal panel assembling body includes a liquid crystal panel 36, a light guide plate 42, a discharge tube 38 and a reflector 40. In FIG. 9, the light guide plate 42 and the reflector 40 are seen. Both end portions of the discharge tube 38 are supported by the reflector 40 through the support member 48. The support member 48 is made of silicon. Silicon is material which is resistant to a high voltage and the heat conductivity of silicon is high. Accordingly, there is a tendency that the temperatures of both end portions of the discharge tube 38 are decreased and mercury is collected to both end portions of the discharge tube 38, however, according to the present invention, an intermediate portion of the discharge tube 38 is cooled so that mercury can be collected to the intermediate portion of the discharge tube 38. Further, an outer peripheral portion of the liquid crystal panel assembling body is held by the metallic frame member 50. A sectional shape of the frame member 50 is formed into L-shape, and a portion of the reflector 40 is exposed from the frame member 50. Air, which has been blown out by the fan 22 and sent into the air inlet 44 of the cover 14, first collides with the frame member 50 and then collides with an exposed portion of the reflector 40. Due to the foregoing, the air cools the discharge tube 38 through the frame member 50 and the reflector 40.

Next, a variation of the discharge tube and the reflector will be explained below.

Figure 11:
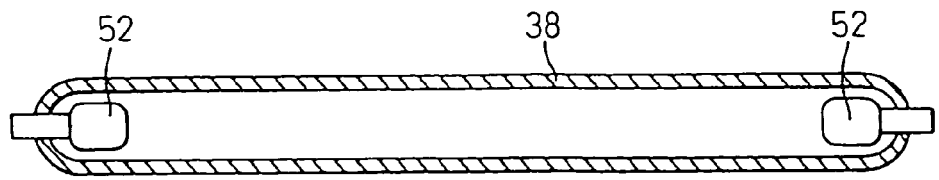
FIG. 11 is a sectional view showing a discharge tube.
Figure 12:
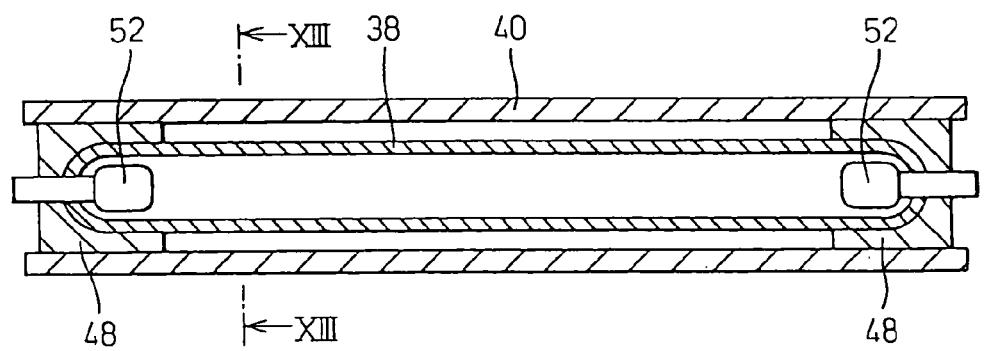
FIG. 12 is a sectional view showing an example of the discharge tube and the reflector.
Figure 13:
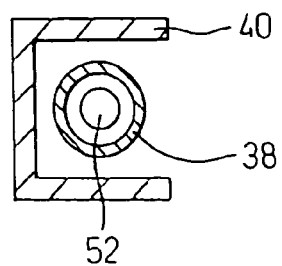
FIG. 13 is a sectional view taken on line XIII-XIII in FIG. 12.

FIG. 11 is a sectional view showing a discharge tube, FIG. 12 is a sectional view showing an example of the discharge tube and the reflector. FIG. 13 is a sectional view of the light source device taken on line XIII-XIII in FIG. 12. The discharge tube 38 is a cold cathode ray tube referred to as a fluorescent lamp. At both end portions of the discharge tube 38, the electrodes 52 made of metal such as Ni or W are provided. Rare gas (Ar or Ne) and mercury are charged into the discharge tube 38, and fluorescent material is coated on the inner wall of the discharge tube 38. For example, the reflector 40 is an aluminum mirror. A cross sectional shape of the reflector 40 is formed into U-shape so that the discharge tube 38 can be covered with the reflector 40.

The support members 48 are arranged in portions close to the electrodes of the end portions of the discharge tube 38. The support members 48 support the discharge tube 38 by the reflector 40. An inner face of each support member 48 is closely contacted with the discharge tube 38 and an outer face is closely contacted with the reflector 40. One portion of the electrode 52 is located inside the discharge tube 38. The other portion of the electrode 52 penetrates end portions of the discharge tube 38 and the support member 48 and protrudes outside from the support member 48.

The support member 48 is composed of a heat insulating structure so that the temperature of a portion close to the electrode 52 of the discharge tube 38 can be prevented from decreasing. In this embodiment, the support member 48 is made of a heat insulating material, the voltage-proof property of which is high. For example, the support member 48 is made of aramid fibers. The support member 48 may be made of glass wool.

Since the support member 48 must be resistant to high voltage impressed upon the electrode 52, the conventional support member 48 is made of silicon. Since the heat conductivity of silicon is high, heat generated by the discharge tube 38 is thermally conducted to the reflector 40 through the support member 48. Therefore, the temperature of a portion close to the electrode 52 of the discharge tube 52 becomes the lowest. In this example, since the support member 48 is made of material, the heat insulating property of which is high, heat generated by the discharge tube 38 is seldom thermally conducted to the reflector 40 through the support member 48. Therefore, a decrease in the temperature of the portion close to the electrode 52 of the discharge tube 38 can be suppressed. Accordingly, an intermediate portion of the discharge tube 38 can be effectively cooled by the flow of air generated by the fan 22.

Figure 14:
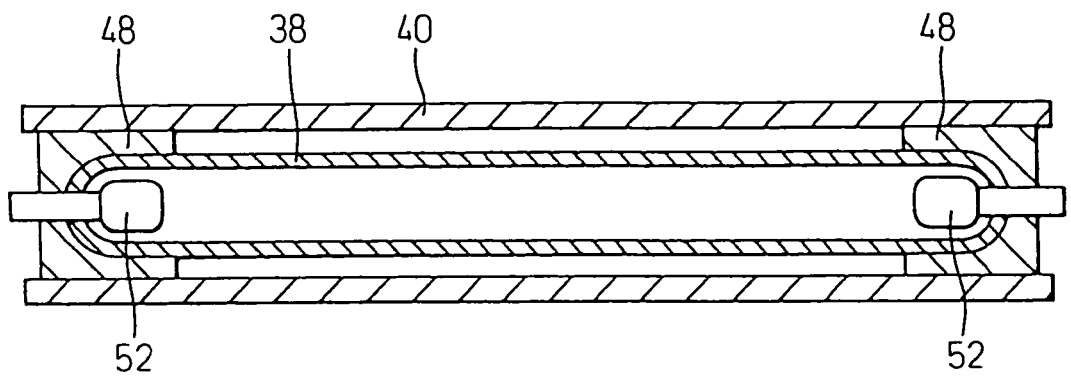
FIG. 14 is a sectional view showing an example of the discharge tube and the reflector.
Figure 15:
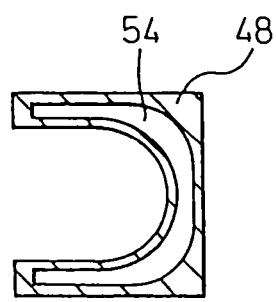
FIG. 15 is a sectional view showing a support member illustrated in FIG. 14.

FIG. 14 is a sectional view showing an example of the discharge tube 38 and the reflector 40. FIG. 15 is a sectional view showing a support member illustrated in FIG. 14. The support member 48 is arranged in a portion close to the electrode 52 of the discharge tube 38, and the discharge tube 38 is supported by the reflector 40 through the support member 48. The support member 48 is composed of a heat insulating structure so that a decrease in the temperature in the portion close to the electrode 52 of the discharge tube 38 can be prevented. In this embodiment, the support member 48 is made of silicon in the same manner as that of the conventional support member, however, the support member 48 is composed of a heat insulating structure in which the hollow portion 54 is formed.

Figure 16:
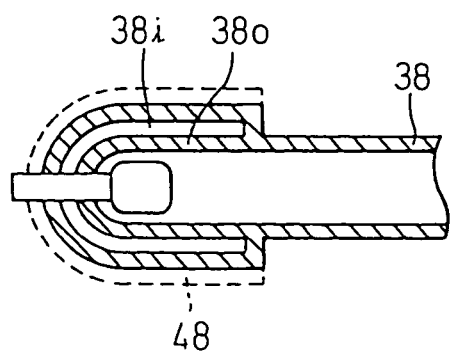
FIG. 16 is a sectional view showing an example of the discharge tube and the reflector.

FIG. 16 is a sectional view showing an example of the discharge tube 38 and the reflector 40. (In FIG. 16, the reflector 40 is omitted.) In this embodiment, the discharge tube 38 is partially composed of a heat insulating structure so that a decrease in the temperature in the portion close to the electrode 52 of the discharge tube 38 can be prevented. That is, an end portion of the discharge tube 38 is composed of a double-tube-structure including the outer tube 38o and the inner tube 38i. There is provided a heat insulating portion, which is composed of an air layer or a vacuum layer, between the outer tube 38o and the inner tube 38i. The support member 48 is arranged round the outer tube 38o and supports the discharge tube 38 by the reflector 40.

Figure 17:
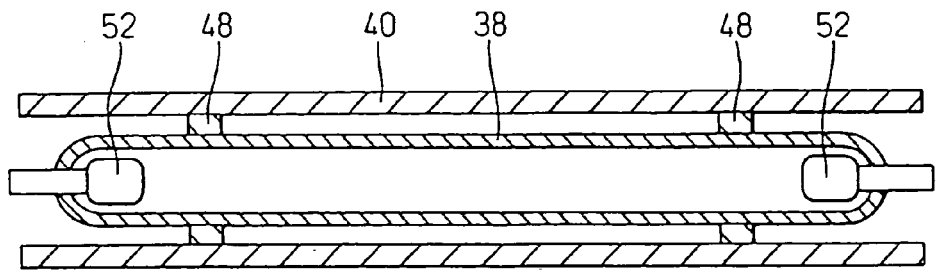
FIG. 17 is a sectional view showing an example of the discharge tube and the reflector.

FIG. 17 is a sectional view showing an example of the discharge tube 38 and the reflector 40. In this embodiment, the support member 48 is arranged at an inner position distant from the end portion of the discharge tube 38 so that a decrease in the temperature in the portion close to the electrode 52 of the discharge tube 38 can be prevented. As described before, metallic particles of the electrode 52 are attached to a range on the inner wall of the discharge tube 38, and a distance from the end portion of the discharge tube 38 to this range is limited to a certain value. The support member 48 is arranged out of the range in which the metallic particles of the electrode 52 are attached to the inner wall of the discharge tube 38, that is, the support member 48 is arranged at a position located inside the discharge tube 38 being distant from the range in which the metallic particles of the electrode 52 are attached to the inner wall of the discharge tube 38.

In this case, the support member 48 is not necessarily made of a highly heat-insulating material, for example, the support member 48 may be made of silicon, the heat conductivity of which is high.

Figure 18:
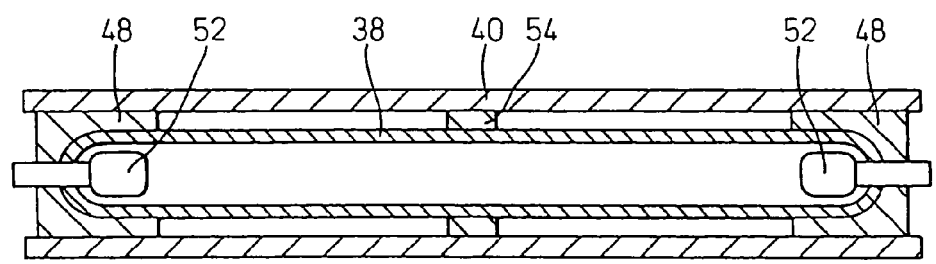
FIG. 18 is a sectional view showing an example of the discharge tube and the reflector.

FIG. 18 is a sectional view showing an example of the discharge tube 38 and the reflector 40. In this embodiment, the heat guide member 54 is provided which comes into contact with the central portion of the discharge tube 38. The support member 48 is made of silicon. The heat guide member 54 is made of silicon, the radiation property of which is high. The reflector 40 is cooled by a flow of air generated by the fan 22. The heat guide member 54 is also contacted with the reflector 40, so that the heat in the central portion of the discharge tube 38 can be released to the reflector. Therefore, a portion, the temperature of which is the lowest, is made in the central portion of the discharge tube 38.

Figure 19:
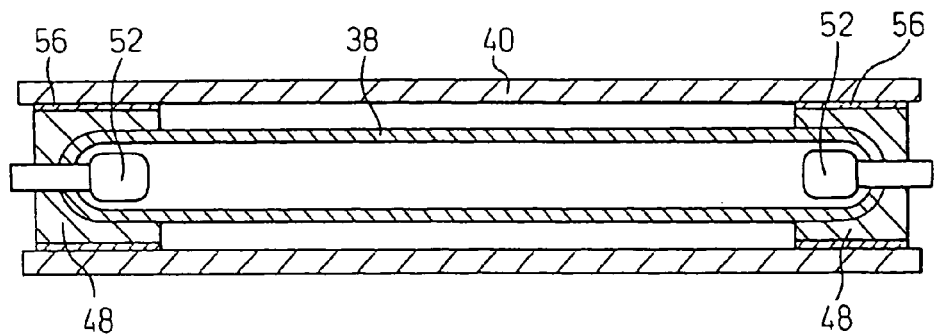
FIG. 19 is a sectional view showing an example of the discharge tube and the reflector.

FIG. 19 is a sectional view showing an example of the discharge tube 38 and the reflector 40. The support portion 48 is arranged in a portion close to the electrode 52 of the discharge tube 38. Therefore, the discharge tube 38 is supported by the reflector 40 through the support member 48. A heat insulating layer (a heat insulating sheet) 56 is arranged between the support member 48 and the reflector 40. Under the condition that the heat insulating layer 56 is stuck onto the support layer 48, the discharge tube 38 is attached to the reflector 40. The support member 48 is made of silicon in the same manner as that of the conventional support member. For example, the heat insulating layer 56 is made of meta-type aramid fibers (for example, CORNEX (Registered Trademark) manufactured by Teijin Ltd.). Although the heat conductivity of the support member 48 is high, since the heat insulating layer 56 intercepts heat, heat can be prevented from being conducted from the end portion of the discharge tube 38 to the reflector 40. Accordingly, a decrease in the temperature in the portion close to the electrode 52 of the discharge tube 38 can be prevented.

Figure 20:
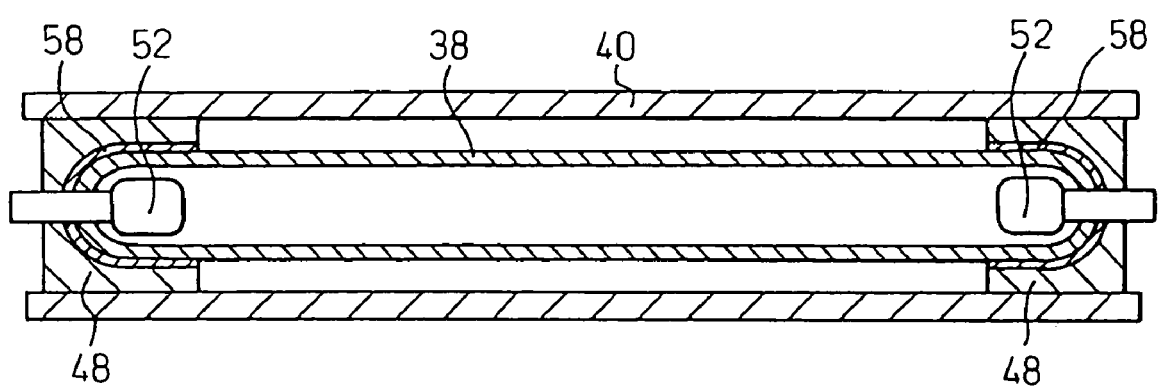
FIG. 20 is a sectional view showing an example of the discharge tube and the reflector.

FIG. 20 is a sectional view showing an example of the discharge tube 38 and the reflector 40. The support portion 48 is arranged in a portion close to the electrode 52 of the discharge tube 38. Therefore, the discharge tube 38 is supported by the reflector 40 through the support member 48. A heat insulating layer (a heat insulating sheet) 58 is arranged between the discharge tube 38 and the support member 48. The support member 48 is made of silicon in the same manner as that of the conventional support member. For example, the heat insulating layer 58 is made of meta-type aramid fibers (for example, CORNEX® manufactured by Teijin Ltd.). Although the heat conductivity of the support member 48 is high, since the heat insulating layer 58 intercepts heat, heat can be prevented from being conducted from the end portion of the discharge tube 38 to the reflector 40. Accordingly, a decrease in the temperature in the portion close to the electrode 52 of the discharge tube 38 can be prevented.

As explained above, according to the present invention, the discharge tube is cooled by a flow of air generated by the fan for cooling the electronic components arranged in the body. Therefore, the discharge tube is sufficiently cooled so that the performance of the discharge tube can be maintained. Since the fan is originally provided in the body, it is unnecessary to greatly change the design of the cover.

What is claimed is:

1. An electronic device comprising:
   a first housing having a cooling fan and an electronic component, said cooling fan cooling said electronic component; and
   a second housing pivotally connected to said first housing, having a display element, a discharge tube for lighting said display element and a reflector, wherein said discharge tube is cooled through said reflector by flowing a flow of air generated by said cooling fan provided in said first housing along said reflector.

2. The electronic device as claimed in claim 1, wherein said first housing includes an air inlet and an air outlet, said cooling fan is arranged between said air inlet and said air outlet, and said second housing includes an air inlet, which is arranged being opposed to said air outlet of said first housing when said second housing is located at a position open to said first housing, and said second housing also includes an air outlet.

3. The electronic device as claimed in claim 2, wherein said air inlet of said second housing is arranged at a position so that a central portion of said discharge tube can be cooled by air sent from said air inlet of said second housing.

4. The electronic device as claimed in claim 2, wherein said air inlet of said second housing is larger than said air outlet of said first housing.

5. The electronic device as claimed in claim 1, wherein said electronic component is CPU, and said cooling fan is arranged so that CPU can be cooled by said cooling fan.

6. The electronic device as claimed in claim 5, wherein CPU is attached with a heat sink, and an air passage to connect said heat sink with said air outlet of said first housing is formed.

7. The electronic device as claimed in claim 1, wherein both end portions of said discharge tube are supported by said reflector through a support member, and a flow of air generated by said cooling fan provided in said first housing cools a portion of said discharge tube arranged inside with respect to said support member.

8. The electronic device as claimed in claim 7, wherein a flow of air generated by said cooling fan provided in said first housing cools a central portion of said discharge tube.

* * * * *